(12) United States Patent
Favero

(10) Patent No.: US 9,938,449 B2
(45) Date of Patent: Apr. 10, 2018

(54) METHOD FOR THE ASSISTED RECOVERY OF PETROLEUM

(75) Inventor: Cedrick Favero, Saint-Romain-le-Puy (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 320 days.

(21) Appl. No.: 13/992,336

(22) PCT Filed: Dec. 8, 2011

(86) PCT No.: PCT/FR2011/052898
§ 371 (c)(1),
(2), (4) Date: Jun. 7, 2013

(87) PCT Pub. No.: WO2012/076816
PCT Pub. Date: Jun. 14, 2012

(65) Prior Publication Data
US 2013/0277055 A1 Oct. 24, 2013

(30) Foreign Application Priority Data

Dec. 9, 2010 (FR) ...................... 10 60317

(51) Int. Cl.
*C09K 8/588* (2006.01)
*E21B 43/16* (2006.01)
(52) U.S. Cl.
CPC .............. *C09K 8/588* (2013.01); *E21B 43/16* (2013.01)
(58) Field of Classification Search
CPC ................................................... C09K 8/588
See application file for complete search history.

(56) References Cited

U.S. PATENT DOCUMENTS

| 4,034,809 | A | * | 7/1977 | Phillips | C09K 8/588 166/270.1 |
| 4,218,327 | A | * | 8/1980 | Wellington | C09K 8/08 166/246 |
| 4,317,758 | A | | 3/1982 | Bruning | |
| 4,795,575 | A | * | 1/1989 | Southwick | C09K 8/588 166/275 |
| 4,867,239 | A | * | 9/1989 | Luetzelschwab | C09K 8/588 166/400 |

(Continued)

FOREIGN PATENT DOCUMENTS

WO   2010/133258   11/2010

OTHER PUBLICATIONS

Polymer Improved Oil Recovery, 2000, Blackie and Son Ltd. (Glasgow and London), pp. 90-104.

(Continued)

*Primary Examiner* — William D Hutton, Jr.
*Assistant Examiner* — Charles R Nold
(74) *Attorney, Agent, or Firm* — Clark & Brody

(57) ABSTRACT

A method for the assisted recovery of petroleum in a deposit by means of the introduction of an aqueous solution of a hydrosoluble polymer into the deposit is characterized in that the aqueous solution is prepared by dissolving a polymer-based composition containing at least one hydrosoluble polymer, at least one radical capturing agent, and at least one sacrificial agent, in an aqueous solution subjected to a step of treatment with at least one deoxygenating agent, prior to the introduction of the polymer-based composition.

15 Claims, 1 Drawing Sheet

(56) References Cited

U.S. PATENT DOCUMENTS 4,925,578 A    5/1990  Southwick et al.

OTHER PUBLICATIONS

Wellington, "Biopolymer Solution . . . Antioxidant Use", Shell Development Co., Dec. 1983, pp. 901-912.
Shupe, "Chemical Stability . . . Polyacrylamide Polymers", SPE Conoco Inc. Aug. 1981, pp. 1513-1529.

* cited by examiner

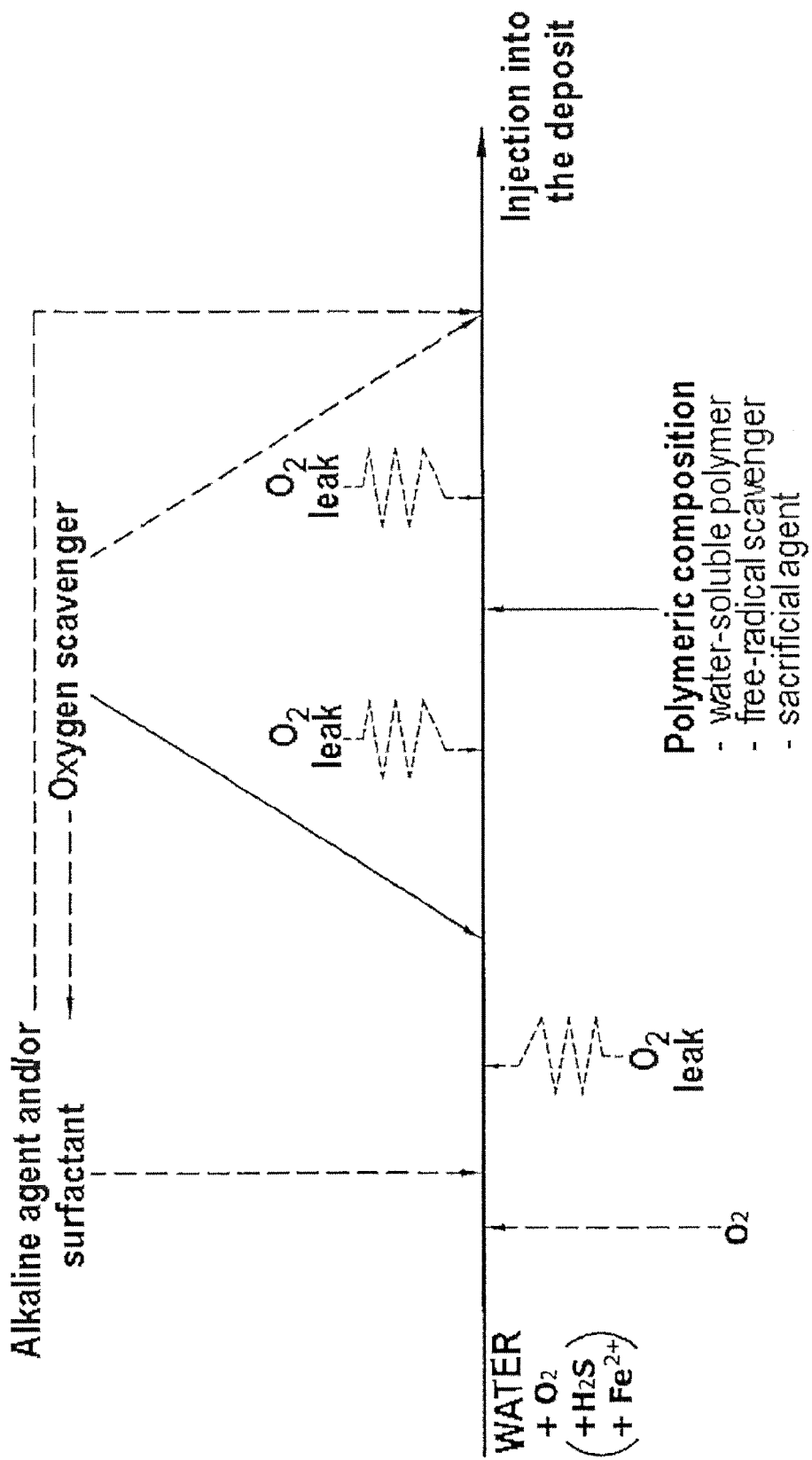

METHOD FOR THE ASSISTED RECOVERY OF PETROLEUM

FIELD OF THE INVENTION

The present invention relates to the technical field of the enhanced recovery of oil in a deposit. More specifically, a subject of the present invention is an improved process for the enhanced oil recovery by virtue of the introduction, into the deposit, a water-soluble polymer aqueous solution employing a particular sequence for the preparation of the water-soluble polymer solution used. In particular, the process according to the invention comprises chemical deoxygenation of the water used to dissolve an optimized composition based on one or more hydrophilic polymer(s), in order to eliminate the degrading effects of oxygen on this or these polymer(s) and thus to improve the oil reservoir flushing effectiveness.

BACKGROUND ART

The recovery of crude oil present in deposits is generally carried out in several steps:

Production results first from the natural energy of the fluids and of the rock, which are decompressed. At the end of this depletion phase, the amount of oil recovered at the surface represents on average some 5 to 150 of the original oil in place. It is therefore necessary, in a second step, to employ techniques targeted at increasing the recovery yield while maintaining the pressure of the field.

The most frequently employed method consists in injecting water into the deposit via injection wells dedicated to this purpose. The term used is then secondary recovery. This second phase stops when the water content in the mixture produced by the output wells is too high. The gain here, in terms of degree of additional recovery, is about 10 to 20%.

The other techniques which can be used are combined under the name of enhanced oil recovery (EOR). Their aim is to recover between 10 and 35% of additional oil. The term "enhanced oil recovery" encompasses various thermal or nonthermal techniques, such as "electrical", "miscible", "steam" or "chemical" techniques for improved recovery of the oil remaining in place (cf. Oil and gas science and technology—IFP review, vol. 63, (2008), No. 1, pp. 9-19). The term "oil" should be understood to mean any type of oil, namely light oil and heavy oil, or even asphaltic oil.

The invention relates more specifically to the enhanced oil recovery by the chemical route involving at least the injection of water-soluble polymers in the form of a dilute solution.

The sweep efficiency by water injection is generally improved by adding water-soluble polymers. The expected and proven benefits of the use of polymers, through rendering the injected water "more viscous", are the improvement in the flushing and the mobility control in the field, in order to recover the oil rapidly and efficiently. These polymers will increase the viscosity of the water.

It is known to those skilled in the art that synthetic water-soluble polymers, and in particular those which are acrylamide-based, are polymers that are highly advantageous for increasing the viscosity of aqueous solutions and are, in fact, used predominantly in enhanced oil recovery.

There are various processes of enhanced oil recovery. Mention may be made of the "surfactant polymer" or SP process or else the "alkaline surfactant polymer" or ASP process, in which processes an amount of surfactant is present in the aqueous, optionally alkaline, solution of water-soluble polymer which is injected into the well. These surfactants make it possible to reduce the surface tension between the oil of the underground formation and the injected solution. The alkaline agent, for its part, reacts with the compounds present in the crude oil, so as to form, in situ, supplementary surfactants which contribute to the emulsification of the oil.

Injection of the viscous solution is, in any event, continuous. At the end of a certain period of time, ranging from several weeks to several months, the polymer, the water and the oil emerge from the reservoir via the output well where the oil is then isolated. Large amounts of water are coproduced and it is also known practice to purify the water from the recovered oil and to recycle it for obvious economic and environmental reasons, but also sometimes for reasons of low water availability. Most commonly, the polymer solution injected is directly prepared on site, in proximity to the oil deposit in which it will be used. The recycled water, but also the seawater, river water, dam water or aquifer water directly available on the site will be directly used. It must be compatible with the polymer. This water must therefore be conditioned for the dissolution of the polymer, since the initial water most commonly contains oxygen, hydrogen sulfide and various other gases, iron and various other metals which are harmful to the stability of the polymer.

Indeed, in a manner known in the prior art, the chemical degradation of polymers is due mainly to the formation of free radicals which will react with the main chain of the polymer and create a drop in the molar mass. This results in a drop in viscosity of the polymer-based solution.

The presence of oxygen is the most harmful factor with regard to the degradation of the polymer. This reaction of polymer degradation by oxygen is amplified by the presence of metals such as iron, but also copper or nickel, or by the presence of hydrogen sulfide.

It is known practice, in the prior art, to use oxygen scavengers (sulfite, bisulfite, dithionite, hydrazine, etc.); the term "chemical deoxygenation" is then used. Mention may, moreover, be made of applications FR 2 945 542 and WO 2010/133258, in the name of the applicant, describing a composition based on anionic polymers or water-soluble amphoteric (co)polymers suitable for viscosifying the injection fluids for oil recovery. This composition further contains, before dilution with the injection fluid, at least 3 stabilizing agents chosen from the group comprising oxygen scavengers, precipitating agents, free-radical scavengers, complexing agents and sacrificial agents, said stabilizing agent being suitable for preventing the chemical degradation of the polymer once the polymer is introduced into the injection fluid. U.S. Pat. No. 4,795,575, for its part, describes an enhanced oil recovery process which provides for the injection of an alkaline aqueous solution substantially free of dissolved oxygen due to the incorporation of an oxygen scavenger, such as a bisulfite, present at between 100 and 500 ppm in the aqueous solution injected.

Nonchemical deoxygenation processes based on inert gases also exist. The gas displaces the oxygen present in the solution, either by bubbling, or by cycles of reequilibration of the pressure by this gas. These processes are often expensive and are not used in the context of the invention.

In concentrations of less than 50 ppb of dissolved oxygen, the degradation of the polymer is low and acceptable. In this case, a relatively low amount of oxygen scavenger, as envisioned by the applicant in its patent application FR2945542, is sufficient to neutralize the oxygen.

On the other hand, for concentrations above 50 ppb of oxygen, the degradation of the polymer is high and de facto decreases the effectiveness of the polymer-based solution, during the flushing of the oil well. It is therefore necessary to add larger amounts of oxygen scavengers.

It should also be emphasized that there are numerous sources of contamination of the water by dissolved oxygen ($O_2$). There are sources termed "controllable" since they are either of intentional origin or of identified origin, and sources termed "uncontrollable" since they are not constant.

The "controllable" sources of $O_2$ are, for example:
the initial presence of oxygen in the water (unintentional source);
the intentional oxygenation or purification (filtration, precipitation, etc.) of the water in order to remove the gases, metals and impurities contained in the water;
the oxygen contained in the aqueous solutions added into the circuit, for instance the alkaline solutions or the compositions based on surfactants, cosurfactants, solvents and/or cosolvents.

The "uncontrollable" sources of oxygen are, for example:
oxygen leaks in the circuit;
oxygen leaks at the level of the polymer dissolving unit;
the oxygen present in the particles or grains of carbonate and/or polymer for example, added into the circuit, described as occluded oxygen.

In an enhanced oil recovery process which involves the use of a viscous solution of water-soluble polymer(s), both the oxygen present in the water used to dissolve the various chemical products and also the redox potential of the deoxygenated water are regularly tested. However, since this type of test takes place on surface equipment, and the reaction for reduction of the oxygen by the oxygen scavengers is not instantaneous, it is not possible to know with certainty whether there is an oxygen leak, between the measurement of the oxygen level or of the redox potential, and the injection into the well. As a result, an excess of oxygen scavenger is generally added in order to guard against these possible leaks and these possible pollutions.

However, it is known to those skilled in the art that a large excess of the oxygen scavenger also leads to degradation of the polymer. Indeed, the reintroduction of oxygen into a system comprising a polymer in solution with an excess of oxygen scavenger is extremely harmful to the polymer. This is because an oxidation-reduction reaction is created between the $O_2$ and the oxygen scavenger, giving radicals which then degrade the polymeric chain, this phenomenon being accentuated in the presence of $Fe^{2+}$ ions. The degradation of the polymer can then be very rapid and the oil well flushing effectiveness is accordingly drastically affected. As it happens, the risks of oxygen reintroduction are high, given the various sources of oxygen contamination previously recalled.

It is therefore generally recommended to have a precise and controlled metering of oxygen scavenger, in order to have a slight stoichiometric excess, of about 10 to 20%, of this agent in the medium.

Moreover, in the prior art, the use of various stabilizing additives has been envisioned. Among them, the applicant has more specifically focused on the use of free-radical scavengers and sacrificial agents. Formulations containing water, a water-soluble polymer, an oxygen scavenger, a free-radical scavenger and a sacrificial agent have already been described in the prior art. Mention may in particular be made of the following documents:

U.S. Pat. No. 4,925,578 describes an aqueous composition with a pH greater than 10 containing an acrylamide polymer, an oxygen scavenger, a free-radical scavenger and an alcohol which can be used in enhanced oil recovery. The compounds are added through an alkaline brine, and the whole is mixed and used. The addition of oxygen scavenger is carried out at the same time as the other compounds. The use of this composition in the enhanced oil recovery field is described in U.S. Pat. No. 4,795,575;

U.S. Pat. No. 4,317,758 relates, for its part, to an aqueous solution containing an acrylamide polymer, an oxidizing agent/reducing agent pairing and a sulfur-containing stabilizing agent. It is also envisioned to use sodium hydrosulfite compounds as oxygen scavenger, thiourea as free-radical scavenger and mercaptoethanol, but no introduction sequence is presented as advantageous. Two different introduction sequences are nevertheless envisioned: one in which the polymer and the additives are added separately, and another in which all the additives are uniformly mixed with the polymer before the composition is used;

Sorbie in his work entitled "Polymer Improved Oil Recovery", 2000, Blackie and Son Ltd (Glasgow and London), pages 90-104, describes a system for protecting biopolymers containing thiourea, isopropanol and sodium sulfite. A preferential sequence of introduction in an aqueous solution, in which the oxygen scavenger, then the free-radical scavengers and, finally, the polymer are successively added, is proposed;

Wellington, in SPE 9296, proposes stabilizing biopolymers by virtue of the addition of oxygen scavenger before the polymer is added, and of free-radical scavenger for protecting the polymer against any free radicals that might form during an accidental contamination with oxygen. Two particular sequences are envisioned: a first in which the polymer is added to a mixture of water, oxygen scavenger and free-radical scavenger, and a second sequence in which the polymer is added to an aqueous solution containing an excess of an oxygen scavenger, and then this solution is diluted in an aqueous solution containing a free-radical scavenger and a sacrificial agent. Wellington also describes the synergistic effect linked to the combination of thiourea (free-radical scavenger) and PA (sacrificial agent);

Shupe in SPE9299 describes how to stabilize polyacrylamides by testing the effects of various additives, without, however, testing complex combinations and without giving an introduction sequence.

Nevertheless, the applicant has demonstrated that the various processes for preparing an aqueous composition of water-soluble polymer(s) that are described in the above-mentioned documents do not enable an optimal protection of the water-soluble polymers used in oil fields. There remains therefore a need for a solution which makes it possible to obtain maximum protection of the polymers, knowing that the number of sequences combining the addition of polymer and of stabilizing additives envisioned in the prior art can amount to thousands.

SUMMARY OF THE INVENTION

In this context, one of the objectives of the invention is to overcome the problems due to the various controllable and uncontrollable sources of oxygen and to provide a novel process for enhanced oil recovery in a deposit by virtue of the introduction, into the deposit, of an aqueous solution of at least one water-soluble polymer using a specific process for preparing the aqueous composition of the water-soluble polymer(s) introduced which allows optimal protection of the water-soluble polymers used on oil fields. The subject of the present invention is an improved process for enhanced oil recovery which employs chemical deoxygenation of the water used to dissolve the water-soluble polymer(s), in order, on the one hand, to eliminate the degrading effects of the oxygen on this or these polymer(s) and thus to improve the oil reservoir flushing effectiveness and, on the other hand, to eliminate the damaging effects that the presence of an oxygen scavenger in excess might present.

Another objective of the invention is to provide a process for preparing an aqueous composition of water-soluble polymer(s) which makes it possible to obtain a maximum viscosity of the viscous solution thus prepared and injected into the oil well, and to maintain a high level of viscosity during the propagation of this solution in the reservoir. Indeed, the operation of flushing an oil reservoir is all the more effective if the viscosity of the polymer solution injected remains stable during its propagation.

To achieve these objectives, the present invention relates to a process for enhanced oil recovery in a deposit by virtue of the introduction, into the deposit, of an aqueous solution of at least one water-soluble polymer, characterized in that said aqueous solution is prepared by dissolving a polymer-based composition containing at least one water-soluble polymer, at least one free-radical scavenger, and at least one sacrificial agent, in an aqueous solution, which has been subjected, prior to the introduction of the polymer-based composition, to a treatment with at least one oxygen scavenger.

It has been discovered, surprisingly and completely unexpectedly, that the above introduction sequence makes it possible to obtain an increased stability of the polymer in the oil well. The use of a composition containing at the same time at least one polymer, at least one free-radical scavenger and at least one sacrificial agent confers optimum protection of the polymer during all the phases of its introduction in an aqueous solution, while minimizing the risks of degradation and of loss of viscosity, during the injection, and then after the introduction of the aqueous solution containing the polymer into the oil deposit, even when the aqueous solution contains a large excess of oxygen scavenger.

BRIEF DESCRIPTION OF THE DRAWING

FIG. 1 shows a schematic drawing of one embodiment of the inventive process.

DETAILED DESCRIPTION OF THE INVENTION

The description which follows, with reference to FIG. 1, will make it possible to understand the invention more clearly. FIG. 1 illustrates diagrammatically an exemplary embodiment of the invention, the arrows represented as dashed lines being optional. The improved process for enhanced oil recovery according to the invention employs a deoxygenating treatment of an aqueous solution containing, in particular, at least 50 ppb of dissolved oxygen, so as to eliminate the harmful effect of the dissolved $O_2$ on the polymer(s) that will be placed in solution in this treated aqueous solution. As shown in FIG. 1, the process according to the invention comprises the following two successive essential steps:

a step of deoxygenating the aqueous solution by adding at least one oxygen scavenger, in stoichiometric excess relative to the oxygen dissolved in the aqueous solution into which it is introduced;

then, after the deoxygenation step, a step of dissolving, with the aqueous solution, a composition containing at least one water-soluble polymer, at least one free-radical scavenger, and at least one sacrificial agent.

According to implementation variants, which can optionally be combined with one another:

before the addition of oxygen scavenger, the aqueous solution is subjected to an intentional oxidation and/or purification step, so as to reduce the content of $H_2S$ and/or $Fe^{2+}$ in particular, an alkaline agent and/or a composition containing at least one surfactant is introduced into the aqueous solution, before or after the step of treatment with an oxygen scavenger, and before, after or in parallel with the step of dissolving the polymer-based composition, the aqueous solution is subjected to an additional treatment step with at least one oxygen scavenger, before or after the introduction of the polymer-based composition. This additional treatment step with at least one oxygen scavenger can in particular be carried out just before the injection of the aqueous composition containing the water-soluble polymer(s) into the well.

According to the first variant, the oxidation step which makes it possible to reduce the content of $H_2S$ and/or of $Fe^{2+}$ can be carried out by addition, either preferentially of dioxygen ($O_2$) or of an oxidizing agent chosen, for example, from ozone, hydrogen peroxide solution, persulfate, perborate, alkali metal hypochlorite or alkaline-earth metal hypochlorite, etc. Sodium hypochlorite produced by electrolysis from the production water or the brine may, for example, be used.

The invention is most beneficial in particular when, before the addition of at least one oxygen scavenger, the aqueous solution contains at least 50 ppb of oxygen (corresponding to 50 mg of $O_2$ per metric ton of aqueous solution). The measurement of the level of dissolved oxygen can be carried out according to any technique well known to those skilled in the art, for example by virtue of probes for measuring the level of dissolved oxygen, as sold by Mettler Toledo. This method will be preferred to another method of measurement termed "colorimetric reagent" method, which consists in adding a liquid dose of reagent, for example from the company Chemets, to the test solution, and in evaluating the amount of dissolved oxygen as a function of the change in color observed.

Given the various risks of leaking on the circuit that can cause oxygen to be introduced (some of which are diagrammatically represented in FIG. 1), during the deoxygenation step, the oxygen scavenger is added in large excess relative to the oxygen dissolved in the aqueous solution, with a stoichiometric excess of at least one time the stoichiometry (100%) of oxygen dissolved in the aqueous solution. This excess can range up to 50 times the stoichiometry and will preferably range between 1 time and 20 times the stoichiometry of oxygen dissolved in the aqueous solution.

Introducing the oxygen scavenger prior to the dissolving of the polymer composition containing the protective additives makes it possible to considerably limit the risk of degradation of the polymer, in particular for the case where both oxygen and other contaminants would be present in or introduced into the aqueous solution throughout the dissolving, injecting and propagating processes. Indeed, the aqueous solution before the step of treating with an oxygen scavenger contains water in which $O_2$ is dissolved, but also often $H_2S$ and $Fe^{2+}$ ions. The presence both of at least one free-radical scavenger and of at least one sacrificial agent directly in the polymer-based composition that will be dissolved and injected makes it possible, on the one hand, to protect the polymer before its introduction into the aqueous solution and, on the other hand, to combat the attacks by free radicals that might be formed by oxidation-reduction reaction between the oxygen scavenger and the $O_2$ that might subsequently accidentally contaminate the aqueous solution, this phenomena being accentuated in the presence of $Fe^{2+}$ ions. The free-radical scavenger and the sacrificial agent both act on the radicals, preferably, before they attack the polymer. The first (the free-radical scavenger) rapidly catches a part of the radicals formed and a reversible chemical equilibrium reaction is then set in which the scavenger can, at the same time, capture and reproduce radicals, the amount of radicals captured being greater than the amount of radicals reproduced. Its mode of action, even if it is incomplete, makes it possible to act rapidly. In the case where it reproduces radicals, then the scavenger again becomes available to capture other radicals. In order to complete this action, the sacrificial agent consumes the radicals by converting them into chemical compounds without any effect on the polymer chain. For example, the alcohol function of a sacrificial agent is converted into a ketone function by consumption of a radical. This mode of action is termed final or irreversible and advantageously completes that of the free-radical scavenger.

Optionally, before the addition of oxygen scavenger, the aqueous solution which contains water that can come from various sources: purified water, seawater, river water, dam water, aquifer water or water recycled following a previous use in enhanced oil recovery, may have undergone an oxidation step, and in particular an oxidation and/or purification step, so as to reduce the content of other gases (in particular $H_2S$), of metals (in particular $Fe^{2+}$ ions) and/or of impurities present.

As illustrated in FIG. 1, it is possible, in addition to the essential step of treating with an oxygen scavenger in the context of the invention, that will subsequently be referred to as "main treatment step" (and which is symbolized with a solid line in FIG. 1), to introduce, additionally, an oxygen scavenger, which may be identical to or different than that used in the "main" treatment step, at various stages of the process.

According to a first implementation variant, an alkaline agent and/or a surfactant composition containing at least one surfactant and optionally a cosurfactant and/or a solvent and/or a cosolvent can be introduced into the aqueous solution, before the main treatment step with an oxygen scavenger and before the step of dissolving the polymer-based composition. The alkaline and/or surfactant agent(s) can optionally be chemically deoxygenated using an oxygen scavenger. In the latter case, an amount of oxygen scavenger will therefore be added in relation to the main treatment step provided for in the context of the invention. The oxygen scavenger is, most commonly, added in excess relative to the oxygen dissolved in the alkaline and/or surfactant aqueous solution, in particular with a stoichiometric excess of at least 25%. If an additional deoxygenation step also takes place, the latter will preferably be carried out before the introduction of the alkaline agent and of the surfactant.

According to a second implementation variant, an alkaline agent and/or a surfactant composition containing at least one surfactant and optionally a cosurfactant and/or a solvent and/or a cosolvent can be introduced into the aqueous solution, after the main treatment step and after the step of dissolving the polymer-based composition, with an oxygen scavenger. The same other conditions as the first variant are preferably reiterated in this case (amount of oxygen scavenger and treatment step).

According to a third implementation variant which can be combined with the previous ones, it is also possible to introduce an oxygen scavenger after the mixing of the polymer-based composition with the aqueous solution having undergone a first deoxygenation. In the context of the invention, an excess of oxygen scavenger is not troublesome. In particular, it will be possible to add, at most, the same amount of oxygen scavenger as in the main step. Such an introduction of oxygen scavenger may, for example, be carried out just before the injection of the aqueous composition containing the water-soluble polymer(s) into the well.

The dissolving of the polymer-based composition in the aqueous solution having being subjected beforehand to a deoxygenation step can be carried out by any means. It is possible to add the polymer-based composition on a line for circulation of the aqueous solution comprising at least one oxygen scavenger. This polymer-based composition may be in liquid or solid form. The preferred forms are powder and inverse emulsion. In the case where it is in powder form, this dissolution can be carried out, in particular, by means of a unit as described in patent application WO 2008/107492, and sold by the applicant under the reference PSU, "Polymer Slicing Unit".

Reference may be made to the WO patent application above for further details regarding the unit which can be used in the context of the invention for incorporating the polymer-based composition into the aqueous solution. This unit operates under an inert atmosphere and makes it possible to reduce the risks of oxygen introduction in this step of dissolving the polymer in the aqueous solution.

In the context of the invention, the final aqueous solution containing the desired polymer(s) is then injected into an oil deposit, according to any technique known to those skilled in the art in processes for enhanced oil recovery, also known as "EOR". Its preparation is carried out on site, just upstream of its injection into the deposit. In general, all the components introduced into the aqueous solution (polymer-based composition, but also $O_2$, in the case of a pretreatment in order to remove Fe and $H_2S$ in particular, alkaline agent, surfactant) are most commonly added on a line for circulation of the aqueous solution as illustrated diagrammatically in FIG. 1.

The amounts added will be determined according to the desired amounts that will in particular be detailed in the remainder of the description. Regarding the polymer-based composition, it will preferably be introduced so as to obtain a concentration of water-soluble polymer of at most 10 g/l, and preferentially of at most 5 g/l of aqueous solution in which it is injected. Finally, advantageously, the aqueous solution of water-soluble polymer obtained, that will be injected into the deposit, has an optimal viscosity included in the range of from 2 to 200 cps (centipoises) (viscosity measurements at 20° C. with a Brookfield viscometer with a UL or S85 module).

A detailed description will now be given, firstly, of the various compounds present in the polymer-based composition and, secondly, of those present in the aqueous solution.

The polymer-based composition is composed of two parts, an "active" part and an "additive" part. The active part consists exclusively:
  of the water-soluble polymer(s),
  of the free-radical scavenger(s),
  of the sacrificial agent(s).

The additive part comprises all the other components optionally present in the composition, and in particular "additive" agents, which are optional and which however have no role in the effectiveness of the process of the present invention, among which are:
- water,
- additives, for instance oil, surfactants necessary for forming the inverse emulsion, or making the free-radical scavengers, the sacrificial agents and the polymer compatible with one another.

It should be noted that the polymer-based composition does not contain oxygen scavenger.

The polymer-based composition is generally constituted of at least 30% by weight of active part and can comprise from 0 to 70% by weight of additive part. In the case where the polymer-based composition is in the form of a powder, the active part will represent the major part of the composition. In the case of an inverse emulsion, the additive part containing water will constitute a large part. Most commonly, the active part comprises at least 35% by weight of water-soluble polymer, from 0.1% to 35% by weight of free-radical scavenger and from 0.1% to 35% by weight of sacrificial agent, it being understood that the sum of the proportions of water-soluble polymer, free-radical scavenger and sacrificial agent constituting said active part is equal to 100%. Consequently, the polymer-based composition always comprises at least 10.5% by weight of water-soluble polymer.

The process according to the invention is suitable for any type of water-soluble polymer, known to have a thickening role and/or conventionally used in oil recovery processes, and particularly synthetic water-soluble polymers.

In particular, the water-soluble polymer(s) present in the polymer-based composition that will be mixed with the deoxygenated water can, in particular, be any type of water-soluble anionic organic polymer, including amphoteric (co) polymers.

In particular, the water-soluble polymers described by the applicant in patent application FR2945542, and in particular the acrylamide-based polymers, may be present in the injected aqueous solution. Most commonly, the water-soluble polymer(s) used has (have) a molecular weight greater than or equal to 1 million g/mol, in particular included in the range of from 1 to million g/mol. Polymers based on acrylamide (preferably representing at least 10 mol %) copolymerized with, as desired, acrylic acid, 2-acrylamido-2-methylpropanesulfonic acid or N-vinylpyrrolidone will be preferred. According to one particular embodiment, the polymer used has an anionicity of less than 70 mol %.

According to the invention, the water-soluble polymer(s) used does (do) not require the development of a particular polymerization process. They can be obtained by any of the polymerization techniques well known to those skilled in the art (solution polymerization, suspension polymerization, gel polymerization optionally including a cohydrolysis or post-hydrolysis step, precipitation polymerization, emulsion (aqueous or inverse) polymerization optionally followed by a spray drying step (drying by atomization or on a drum), suspension polymerization, micellar polymerization optionally followed by a precipitation step).

By virtue of the selection of monomers and of the various polymerization additives, the polymer(s) present in the composition may have a linear, branched or crosslinked structure or a comb polymer or star polymer architecture.

The active part of the polymer-based composition may contain, for example, at least 35% by weight of water-soluble polymer, and preferably at least 50% by weight. The polymer-based composition may thus contain at least 10.5% and preferably at least 15% by weight of polymer.

The other active agents used in the polymer-based composition, namely free-radical scavengers and sacrificial agents, act, with respect to the water-soluble polymer, as stabilizers. These various agents are well known to those skilled in the art and have been classified according to the above names, as a function of their previously detailed mode of operation.

In the context of the invention, the free-radical scavengers which will most commonly be used are chosen from sulfur-containing compounds, sterically hindered amines, aromatic compounds and nitroxides. These compounds have the ability to capture the radical which is then no longer immediately available for degrading the polymer. Many free-radical scavengers developed for stabilizing polymers exist. By way of example, mention may be made of the following compounds: thiourea, 2-mercaptobenzothiazole, dimedone, N,N'-dimethylthiourea, N,N'-diethylthiourea, N,N'-diphenylthiourea, ammonium thiocyanate, tetramethylthiuram disulfide, 2,2'-dithiobis(benzothiazole), sodium dimethyldithiocarbamate, para-methoxyphenol, propyl 3,4,5-trihydroxybenzoate, 2,6-di-tert-butyl-4-methylphenol, 2,5-di (tert-amyl)hydroquinone, 4,4'-thiobis(6-tert-butyl-m-cresol), ammonium N-nitrosophenylhydroxylamine, butylhydroxyanisole, 8-hydroxyquinoline, 4-hydroxy-2,2,6, 6-tetramethylpiperidinooxy, 5-hydroxy-1,4-naphthoquinone, N-(1,3-dimethylbutyl)-N'-phenyl-p-phenylenediamine, 2,6-di-tert-butyl-4-methylphenol, 2,5-di(tert-amyl) hydroquinone, 4,4'-thiobis(6-tert-butyl-m-cresol), dicyandiamide, guanidine derivatives, cyanamide, etc.

This list may not be exhaustive by virtue of the number of possible variations with respect to these often complex chemistries. Preferentially, the free-radical scavenger(s) used will be chosen from thiourea, alkyl thioureas, mercaptobenzoimidazole (MBI), mercaptobenzothiazole (MBT) and combinations thereof as used by Shell, Diafloc and Nitto in U.S. Pat. No. 4,317,759, U.S. Pat. No. 4,925,578, U.S. Pat. No. 4,481,316, U.S. Pat. No. 4,795,575 and U.S. Pat. No. 3,235,523, butylhydroxyanisole, para-methoxyphenol, quinolinol as mentioned in JP57-159839 from Mitsubishi Chemicals, 5,5-dimethyl-1,3-cyclohexanedione as described in U.S. Pat. No. 4,622,356 from American Cyanamid, sodium thiocyanate as described in U.S. Pat. No. 3,234,163 from Dow, phenylphosphonic compounds and phosphites.

In addition to the effectiveness, taking into account the physicochemical, toxicological and economic criteria makes it advantageous to use a compound such as N,N'-diethylthiourea, N,N'-dimethylthiourea, diphenylguanidine, mercaptobenzothiazole and/or mercaptobenzoimidazole, without this being limiting.

The active part of the polymer-based composition that will be mixed with the deoxygenated aqueous solution contains between 0.1% and 35% by weight of free-radical scavenger(s). When several free-radical scavengers are used, this amount corresponds to the total amount of free-radical scavengers.

The active part of the polymer-based composition also contains one or more sacrificial agent(s). Most commonly, the sacrificial agent(s) belong to the alcohol family, as described in documents U.S. Pat. No. 4,141,842 and JP57159839. It is also possible to use a monomer as described in patent application FR 2604444 to which reference may be made for further details. The alcohol, by virtue of its hydroxyl function, is oxidized in its ketone form and thus consumes the radical, while the monomer, by virtue of its double bond, consumes the radical by radical polymerization. The list of alcohols and monomers that can be used is virtually unlimited. Most of the constituent monomers of water-soluble polymers are suitable, and diallyldimethylammonium chloride, acrylamide and methacrylamide can be mentioned as monomer of choice, without this being limiting.

The alcohols can be monoalcohols or polyols and the criteria for selection are the number of hydroxyl functions per unit weight and the solubility in water. More particularly of interest, without this being limiting either, the following alcohols may be mentioned: glycerol, propylene glycol, trimethylene glycol, isopropanol, 1,2-butanediol, 1,3-butanediol, 1,4-butanediol, 2,3-butanediol, 1,2,4-butanetriol, pentaerythritol (PET), trimethylolethane, neopentyl glycol, 1,2-pentanediol, 2,4-pentanediol, 2,3-pentanediol, trimethylolpropane, 1,5-pentanediol, partially or totally hydrolyzed polyvinyl alcohol, etc.

The active part of the polymer-based composition that will be mixed with the deoxygenated aqueous solution contains between 0.1% and 35% by weight of sacrificial agent(s). When several sacrificial agents are used, this amount corresponds to the total amount of sacrificial agents.

The aqueous solution into which the polymer-based composition is introduced comprises:
    water,
    at least one oxygen scavenger,
    optionally at least one surfactant composition containing at least one surfactant and optionally a cosurfactant and/or a solvent and/or cosolvent,
    optionally at least one alkaline agent.

The oxygen scavengers (also sometimes called reducing agents) intervene directly on the oxygen, which creates or accelerates the formation of radicals. During the deoxygenation step according to the invention, the oxygen scavengers which can be used are, in a nonexhaustive manner, compounds such as sulfites, bisulfites, metabisulfites, dithionites of alkali metals or alkaline-earth metals, and in particular of sodium, hydrazine and its hydroxylamine derivatives or else a mixture of sodium borohydride and bisulfite. Their use for polyacrylamides is described in U.S. Pat. No. 3,343,601. They all act as a reducing agent which modifies the redox potential of the aqueous solution into which they are introduced. It is also possible to envision using an oxygen scavenger chosen from organic sulfites such as alkylated sulfites, alkyl hydro-sulfites, sulfinates, sulfoxylates, phosphites, but also oxalic acid or formic acid, erythorbate salts, and carbohydrazides. These oxygen scavengers make it possible to remove the traces of oxygen in the injection water so as to typically achieve dissolved oxygen contents of less than 50 ppb (parts per billion). Preferentially, in accordance with the physicochemical, toxicological and industrial criteria, oxygen-scavenger compounds of organic and inorganic sulfite type are particularly advantageous. Mention will, for example, be made of $Na_2SO_3$ (sodium sulfite), NaDT (sodium dithionite) and ammonium bisulfite. The deoxygenation can be carried out with a single oxygen scavenger or a mixture of oxygen scavengers.

As previously indicated, the water with which the polymer-based composition will be mixed can contain a surfactant-based composition. The surfactants are of any type, namely anionic, cationic, nonionic or zwitterionic, and of varied structure, namely linear, gemini, branched.

The surfactant compound may be formulated with, if necessary, solvents and cosolvents suitable for obtaining the desired physicochemical characteristics. These variations do not in any way affect the expected benefit of the present invention. The amounts of surfactant compounds present generally correspond to 0.5 to 15 times the total weight of water-soluble polymer present in the aqueous solution, after addition of the polymer-based composition.

It is also possible for the water with which the polymer-based composition will be mixed to contain one or more alkaline agents, for example chosen from hydroxides, carbonates, borates and metaborates of alkali metals or of alkaline-earth metals. Preferably, sodium hydroxide or sodium carbonate will be used. The amounts of alkaline agent generally correspond to 0.5 to 15 times the total weight of water-soluble polymer used.

The examples hereinafter make it possible to illustrate the invention, but are in no way limiting in nature.

EXAMPLES

The experiments were carried out using an oil reservoir production water which had already been purified to remove its residual oil and its suspended solids to values of less than, respectively, 50 and 20 ppm. This water therefore has the injectivity characteristics required for dissolving the polymer with good injectivity characteristics during the reinjection into the oil reservoir. The water contains an $H_2S$ content of 67 ppm and an $Fe^{2+}$ content of 3 ppm. These contents are dictated by the conditions and the geology of the reservoir and by the state of the oil production equipment. These contents are those measured at the end of the purification by flotation and nutshell filtering.

The polymer used at a concentration of 1000 ppm is a copolymer of acrylamide (70 mol %) and of acrylic acid (30 mol %) with a molecular weight of 20 million g/mol (Flopam FP3630S).

The brine in which the polymer and the various additives were added has the following composition:

| Test brine at 4700 mg/l | |
|---|---|
| For 1000 g | |
| NaCl | 2.657 g |
| KCl | 0.03 g |
| $CaCl_2 \cdot 2H_2O$ | 0.834 g |
| $MgCl_2 \cdot 6H_2O$ | 1.004 g |
| $Na_2SO_4$ | 0.611 g |

This brine has a temperature of 45° C. and the oil reservoir is itself at a temperature of 65° C.

The brine used contains 125 ppb of $O_2$.

A first series of tests is carried out with the following various additives:
    for the oxygen scavenger: sodium sulfite ($Na_2SO_3$) at 5 ppm. 7.88 ppb of $Na_2SO_3$ are necessary to consume 1 ppb of $O_2$: 5 ppm therefore correspond to a deoxygenation at 5 times the stoichiometry;
    for the sacrificial agent: pentaerythritol (PET) at 250 ppm;
    for the free-radical scavenger: N,N'-diethylthiourea at 300 ppm.

Comparative Example 1

The polymer is premixed with the oxygen scavenger, the sacrificial agent and the free-radical scavenger. The mixture is then dissolved in the brine.

Comparative Example 2

The polymer is first dissolved in the brine. After the polymer has dissolved, the mixture, previously prepared, of the oxygen scavenger, the sacrificial agent and the free-radical scavenger is added.

Comparative Example 3

The mixture of the oxygen scavenger, the sacrificial agent and the free-radical scavenger is first of all dissolved in the brine. Once this mixture has dissolved, the polymer is then added.

Example 1 According to the Invention

The oxygen scavenger is first of all added to the brine. Once dissolved, the previously prepared composition containing the polymer, the sacrificial agent and the free-radical scavenger is added.

Monitoring the change in the viscosity of the mixtures makes it possible to evaluate the sequences. The viscosities of the mixtures thus formulated are measured at a temperature of 65° C., this temperature also serving to evaluate the stability of the treatment sequences.

The viscosity is measured with a Brookfield apparatus and a UL module, at a speed of 60 revolutions per minute, and is expressed in centipoises (cps). The samples are placed at 65° C. for 15 days without exposure to atmospheric oxygen.

|  | Initial viscosity (cps) | Viscosity after 15 days at 65° C. (cps) | Change in viscosity (%) |
| --- | --- | --- | --- |
| Comparative Ex. 1 | 7.5 | 4.3 | −43% |
| Comparative Ex. 2 | 7.5 | 3.2 | −45% |
| Comparative Ex. 3 | 7.5 | 5.9 | −21% |
| Ex. 1 according to the invention | 7.5 | 7.6 | +1% |

The sequence according to the invention makes it possible to preserve a stable viscosity of the solution over time. It will therefore be more effective for flushing the reservoir.

Another series of tests is carried out with the sequence of example 1 according to the invention, while varying different parameters.

Example 2 According to the Invention

Compared with example 1 according to the invention, only the oxygen scavenger and its content are modified. Sodium dithionite, an agent very harmful to the polymer when it is in great excess, used at 20 ppm, is chosen. 10.875 ppb of sodium dithionite are necessary to consume 1 ppb of $O_2$: 20 ppm therefore correspond to a deoxygenation at 14.7 times the stoichiometry.

Example 3 According to the Invention

Compared with example 1 according to the invention, only the sacrificial agent and its contents are modified. Dipropylene glycol, used at 100 ppm, is chosen.

Example 4 According to the Invention

Compared with example 1 according to the invention, only the free-radical scavenger is modified. Mercaptobenzothiazole, used at 5 ppm, is chosen.

The results are the following:

|  | Initial viscosity (cps) | Viscosity after 15 days at 65° C. (cps) | Change in viscosity (%) |
| --- | --- | --- | --- |
| Ex. 2 according to the invention | 7.5 | 7.1 | −5% |
| Ex. 3 according to the invention | 7.5 | 7.1 | −5% |
| Ex. 4 according to the invention | 7.5 | 6.9 | −8% |

These results clearly show the advantage of the sequence of the invention, taking other chemical compounds for each family.

Finally, a third series of tests takes into account the variants of the sequence of the invention.

Example 5 According to the Invention

An additional oxygenation step is carried out, prior to the addition of the oxygen scavenger, in order to reduce the hydrogen sulfide concentration to 500 ppb and the $Fe^{2+}$ concentration to 0.3 ppm. This operation consists in injecting dioxygen in gaseous form in order to degas and precipitate ferrous hydroxides. Following this oxygenation step, the brine contains 3.8 ppm of $O_2$ and is at a temperature of 45° C.

The sequence of example 1 according to the invention is then reproduced in this brine, and the oxygen scavenger used is sodium dithionite at 50 ppm, which corresponds to 1.2 times the stoichiometry.

Example 6 According to the Invention

The ASP process is used in this example. An alkaline agent and a surfactant are added to a brine, after the main addition of the oxygen scavenger and after the addition of the polymer-based composition. The brine is softened and has the following composition:

| Softened brine at 5136 mg/l | |
| --- | --- |
| For 1000 g | |
| NaCl | 4.147 g |
| KCl | 0.035 g |
| $NaHCO_3$ | 0.319 g |
| $Na_2SO_4$ | 0.67 g |

The brine contains 160 ppb of $O_2$.

The alkaline agent is sodium carbonate and is used at 3000 ppm so as to obtain a pH of 10. The surfactant is Petrostep® A-I, an alkyl benzenesulfonate anionic surfactant from the company Stepan, and is used at 3500 ppm. These agents are deoxygenated with sodium sulfite.

The sequence of example 1 according to the invention is then reproduced in this brine.

The results are the following:

|  | Initial viscosity (cps) | Viscosity after 15 days at 80° C. (cps) | Change in viscosity (%) |
| --- | --- | --- | --- |
| Ex. 5 according to the invention | 7.7 | 7.9 | +3% |

-continued

|  | Initial viscosity (cps) | Viscosity after 15 days at 80° C. (cps) | Change in viscosity (%) |
|---|---|---|---|
| Ex. 6 according to the invention | 9.3 | 9.7 | +4% |

These results show that the variants of the process make it possible to preserve a stable viscosity of the solution over time.

The invention claimed is:

1. A process for enhanced oil recovery in a deposit, comprising the preparation of an aqueous solution of at least one water-soluble polymer and the introduction of the said prepared solution into the deposit characterized in that said aqueous solution of at least one water-soluble polymer has a viscosity included in the range of from 2 to 200 cps, the viscosity measurements being carried out at 20° C. with a Brookfield viscometer with a UL or S85 module and is prepared with the successive following steps:
   treating an aqueous solution by adding at least one oxygen scavenger, in a stoichiometric excess relative to the oxygen dissolved in the aqueous solution, of at least one times the stoichiometry (100%) up to 50 times the stoichiometry;
   providing a polymer-based composition containing at the same time at least one water-soluble polymer, at least one free-radical scavenger, and at least one sacrificial agent, said water-soluble polymer being chosen from water-soluble organic polymers having a molecular weight greater than or equal to 1 million g/mol, being based on acrylamide copolymerized with acrylic acid, 2-acrylamido-2-methylpropanesulfonic acid or N-vinylpyrrolidone, and being in the form of a powder or an inversion emulsion;
   then, after the deoxygenation step, dissolving, with the treated aqueous solution, the polymer-based composition containing at the same time the at least one water-soluble polymer, the at least one free-radical scavenger, and the at least one sacrificial agent.

2. The process for enhanced oil recovery as claimed in claim 1, characterized in that, before the treatment with at least one oxygen scavenger, the aqueous solution contains at least 50 ppb of oxygen.

3. The process for enhanced oil recovery as claimed in claim 1, characterized in that an alkaline agent and/or a composition containing at least one surfactant is introduced into the aqueous solution, before or after the step of treating with an oxygen scavenger, and before, after or in parallel with the step of dissolving the polymer-based composition.

4. The process for enhanced oil recovery as claimed in claim 1, characterized in that the aqueous solution is subjected to an additional step of treating with at least one oxygen scavenger, before or after the introduction of the polymer-based composition.

5. The process for enhanced oil recovery as claimed in claim 4, characterized in that the aqueous solution is subjected to an additional step of treating with at least one oxygen scavenger, just before the introduction of the aqueous composition containing the water-soluble polymer(s) into the deposit.

6. The process for enhanced oil recovery as claimed in claim 1, characterized in that the polymer-based composition does not contain oxygen scavenger.

7. The process for enhanced oil recovery as claimed in claim 1, characterized in that the polymer-based composition is constituted of at least 30% by weight of an active part which comprises exclusively the water-soluble polymer(s), the free-radical scavenger(s) and the sacrificial agent(s) and the polymer-based composition comprises from 0 to 70% by weight of an additive part which comprises all the other components present in the composition, and in that the active part of the composition contains at least 35% by weight of water-soluble polymer.

8. The process for enhanced oil recovery as claimed in claim 7, wherein the active part of the composition contains at least 50% by weight of water-soluble polymer.

9. The process for enhanced oil recovery as claimed in claim 1, characterized in that the free-radical scavenger is chosen from N,N'-diethylthiourea, N,N'-dimethylthiourea, mercaptobenzothiazole and mercaptobenzoimidazole.

10. The process for enhanced oil recovery as claimed in claim 1, characterized in that the polymer-based composition is constituted of at least 30% by weight of an active part which comprises exclusively the water-soluble polymer, the free-radical scavenger and the sacrificial agent and the polymer-based composition comprises from 0 to 70% by weight of an additive part which comprises all the other components present in the composition, and in that the amount of free-radical scavenger(s) represents from 0.1% to 35% by weight relative to the weight of the active part of the polymer-based composition.

11. The process for enhanced oil recovery as claimed in claim 1, characterized in that the sacrificial agent is chosen from glycerol, propylene glycol, trimethylene glycol, isopropanol, 1,2-butanediol, 1,3-butanediol, 1,4-butanediol, 2,3-butanediol, 1,2,4-butanetriol, pentaerythritol (PET), trimethylolethane, neopentyl glycol, 1,2-pentanediol, 2,4-pentanediol, 2,3-pentanediol, trimethylolpropane, 1,5-pentanediol and partially or totally hydrolyzed polyvinyl alcohol.

12. The process for enhanced oil recovery as claimed in claim 1, characterized in that the polymer-based composition is constituted of at least 30% by weight of an active part which comprises exclusively the water-soluble polymer, the free-radical scavenger and the sacrificial agent and the polymer-based composition comprises from 0 to 70% by weight of an additive part which comprises all the other components present in the composition, and in that the amount of sacrificial agent(s) ranges from 0.1% to 35% by weight relative to the weight of the active part of the polymer-based composition.

13. The process for enhanced oil recovery as claimed in claim 1, characterized in that the oxygen scavenger is chosen from sulfites, bisulfites, bisulfites as a mixture with sodium borohydride, metabisulfites, dithionites of alkali metals or alkaline-earth metals, and hydrazine and its hydroxylamine derivatives.

14. The process for enhanced oil recovery as claimed in claim 1, wherein the stoichiometric excess ranges from 1 time to 20 times the stoichiometry.

15. The process for enhanced oil recovery as claimed in claim 1, wherein the molecular weight is in a range of from 1 to 25 million g/mol.

* * * * *